United States Patent
Weston et al.

(10) Patent No.: US 10,555,113 B2
(45) Date of Patent: Feb. 4, 2020

(54) METHOD AND APPARATUS FOR ADAPTABLE GEOFENCES WORKING IN CONJUNCTION WITH VEHICLES

(71) Applicant: FORD GLOBAL TECHNOLOGIES, LLC, Dearborn, MI (US)

(72) Inventors: Keith Weston, Canton, MI (US); Joshua Sharpe, Birmington, MI (US); Andrew Thomas Cunningham, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/988,666

(22) Filed: May 24, 2018

(65) Prior Publication Data

US 2019/0364381 A1    Nov. 28, 2019

(51) Int. Cl.
*H04W 4/021* (2018.01)
*H04W 4/40* (2018.01)

(52) U.S. Cl.
CPC ............. *H04W 4/021* (2013.01); *H04W 4/40* (2018.02)

(58) Field of Classification Search
CPC ......... H04W 4/02; H04W 4/029; H04W 4/30; H04W 4/48; H04W 4/43; H04W 4/24; H04W 4/025; H04W 4/021; H04W 4/40
See application file for complete search history.

(56) References Cited

U.S. PATENT DOCUMENTS

| 7,493,211 B2* | 2/2009 | Breen ................... G01S 5/0027 340/995.12 |
| 7,848,765 B2* | 12/2010 | Phillips .............. G08B 21/0236 455/456.3 |
| 8,670,933 B2* | 3/2014 | Schenken ............. B60W 40/09 701/454 |
| 8,930,162 B2* | 1/2015 | Wang ..................... H04W 4/02 702/150 |
| 9,615,207 B1* | 4/2017 | Klein ...................... H04W 4/90 |
| 9,776,563 B1 | 10/2017 | Be et al. |
| 9,894,478 B1* | 2/2018 | Deluca .................. H04W 4/021 |
| 2015/0032640 A1 | 1/2015 | Esselink et al. |
| 2015/0120183 A1* | 4/2015 | Annapureddy .... G01C 21/3688 701/430 |
| 2015/0314670 A1 | 11/2015 | Lucht et al. |
| 2017/0230792 A1* | 8/2017 | Shaik .................. G06F 3/04847 |
| 2017/0267170 A1* | 9/2017 | Be ............................ B60Q 9/00 |

* cited by examiner

*Primary Examiner* — Julio R Perez
(74) *Attorney, Agent, or Firm* — Michael Spenner; Brooks Kushman P.C.

(57) ABSTRACT

A system includes a processor configured to receive, via a vehicle-related interface, an object to be geo-fenced. The processor is also configured to receive adaptive parameters defining how a geo-fence should adapt to data types included with the parameters. The processor is further configured to find an instance of the object and create a geo-fence around the found object. The processor is also configured to track data corresponding to the adaptive parameters while a vehicle travels and adapt the created geo-fence based on the tracked data as guided by the parameters.

19 Claims, 5 Drawing Sheets

METHOD AND APPARATUS FOR ADAPTABLE GEOFENCES WORKING IN CONJUNCTION WITH VEHICLES

TECHNICAL FIELD

The illustrative embodiments generally relate to methods and apparatuses for adaptable geo-fences working in conjunction with vehicles.

BACKGROUND

A large number of vehicles on the road today have access to global positioning system (GPS) coordinates. Whether determined by the vehicle itself, or a device within and/or working in conjunction with the vehicle, these coordinates allow for a variety of vehicle-assistance tasks, such as vehicle navigation.

As vehicle communication systems have become more sophisticated, vehicle-assistance has incorporated the notion of a geo-fence. A geo-fence is a virtual fence defined by a bounded set of coordinates. Because the virtual fence coordinates are known, and the vehicle coordinates are known, it can be known whether or not a vehicle location is inside an area defined by the virtual fence.

The preceding concept has been used for a variety of purposes, such as asset movement and tracking. Since a vehicle will not actually drive into a house or building, in many cases, a geo-fence can be used as a proxy for arrival at the destination. That is, when a vehicle is inside a virtual fence defined as representing a location, the vehicle passing into the fenced area will serve as notice that the vehicle is at the location.

SUMMARY

In a first illustrative embodiment, a system includes a processor configured to receive, via a vehicle-related interface, an object to be geo-fenced. The processor is also configured to receive adaptive parameters defining how a geo-fence should adapt to data types included with the parameters. The processor is further configured to find an instance of the object and create a geo-fence around the found object. The processor is also configured to track data corresponding to the adaptive parameters while a vehicle travels and adapt the created geo-fence based on the tracked data as guided by the parameters.

In a second illustrative embodiment, a system includes a processor configured to geo-fence a first object within a perimeter defined based on an adaptive parameter defining perimeter changes based on changes in data associated with a fence configuration. The processor is also configured to associate with the geo-fence a driver-defined action to be taken based on a second object crossing the perimeter. The processor is further configured to adapt the perimeter responsive to observed changes in the data and take the defined action responsive to the second object crossing the perimeter.

In a third illustrative embodiment, a system includes a processor configured to determine that parameters for fence enablement, associated with a plurality of different points of interest (POIs), are met. The processor is further configured to create a plurality of geo-fences around a vehicle, each fence corresponding to a POI and having an action associated therewith. Also, the processor is configured to determine that a fence has encountered the POI corresponding to that fence and, responsive to the fence encountering the POI, taking the action associated with the fence.

DETAILED DESCRIPTION

As required, detailed embodiments are disclosed herein; however, it is to be understood that the disclosed embodiments are merely illustrative and may be incorporated in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
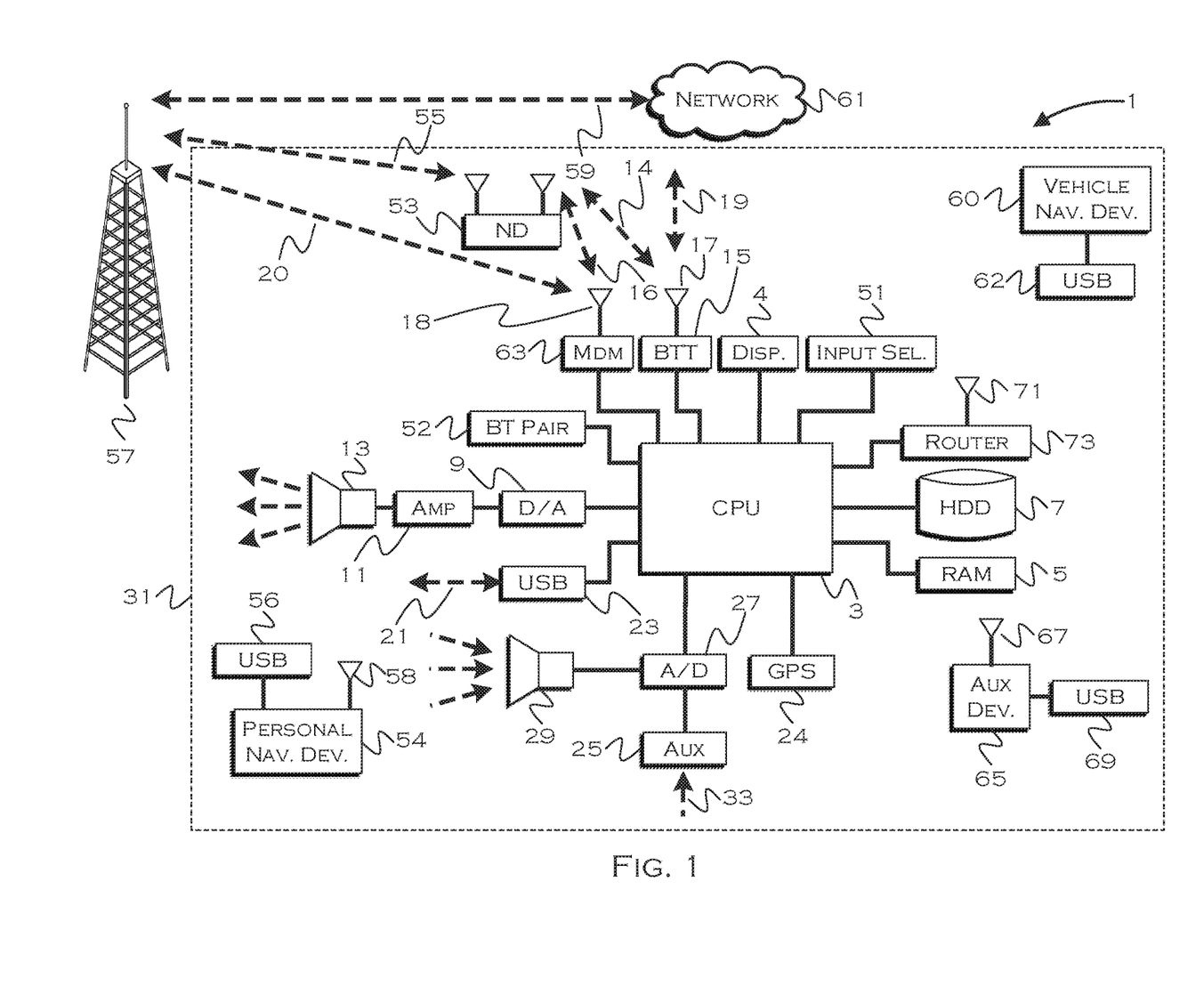
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touchscreen display. In another illustrative embodiment, the interaction occurs through button presses, spoken dialog system with automatic speech recognition, and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be transmitted to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device (hereafter referred to as ND) 53 can then be used to communicate 59 with a network 61 outside the vehicle 31 through, for example, communication 55 with a cellular tower 57. In some embodiments, tower 57 may be a Wi-Fi access point.

Exemplary communication between the ND 53 and the BLUETOOTH transceiver 15 is represented by signal 14.

Pairing the ND 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with ND 53. Alternatively, it may be desirable to include an onboard modem 63 having antenna 18 in order to communicate 16 data between CPU 3 and network 61 over the voice band. The ND 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include Wi-Fi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, the ND 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. If the user has a data-plan associated with the nomadic device, it is possible that the data-plan allows for broadband transmission and the system could use a much wider bandwidth (speeding up data transfer). In yet another embodiment, the ND 53 is replaced with a cellular communication device (not shown) that is installed to vehicle 31. In still another embodiment, the ND 53 may be a wireless local area network (LAN) device capable of communication over, for example (and without limitation), an 802.11g network (i.e., Wi-Fi) or a Wi-Max network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a Wi-Fi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

The illustrative embodiments provide dynamic and adaptive geo-fences that can "react" to current situations or parameters to improve a driving experience or assist in a task, based on a combination of predefined conditions and/or a current situation.

In the illustrative examples, the geo-fence can act as a trigger for an intended or possible interaction between a driver (or driver task) and a location. The fence can be around the vehicle or around the location, and the fence need not always be on. For example, without limitation, if a driver is hungry, but wants to go no more than a few minutes off-route for food, a fence around the vehicle can adaptively define an area within 5 minutes travel. That is, as road speed increases and/or traffic and complexity decreases, the fence could expand, and conversely contract according to the inverse effects. Intersections of the fence and known food serving locations (types of which the fence can react to or ignore, for a more refined result set) can trigger alerts, and if the vehicle stops at a known food location, the fence can dynamically disable itself until it is requested again. The initiation of the fence could be tied to travel during certain times, or could occur responsive to a driver request. This is just one simple, non-limiting example of how a dynamic, adaptable geofence can work in conjunction with a vehicle.

Working in conjunction with variances experienced by vehicles and/or applications, as well as addressing adaptation to changing driver needs and parameters, the illustrative concepts and embodiments provide opportunities to improve the utility and functionality of traditional geo-fencing. The novel, uncommon and atypical examples and concepts described herein demonstrate potential improvements achievable through use of those examples, concepts, and the like.

Figure 2:
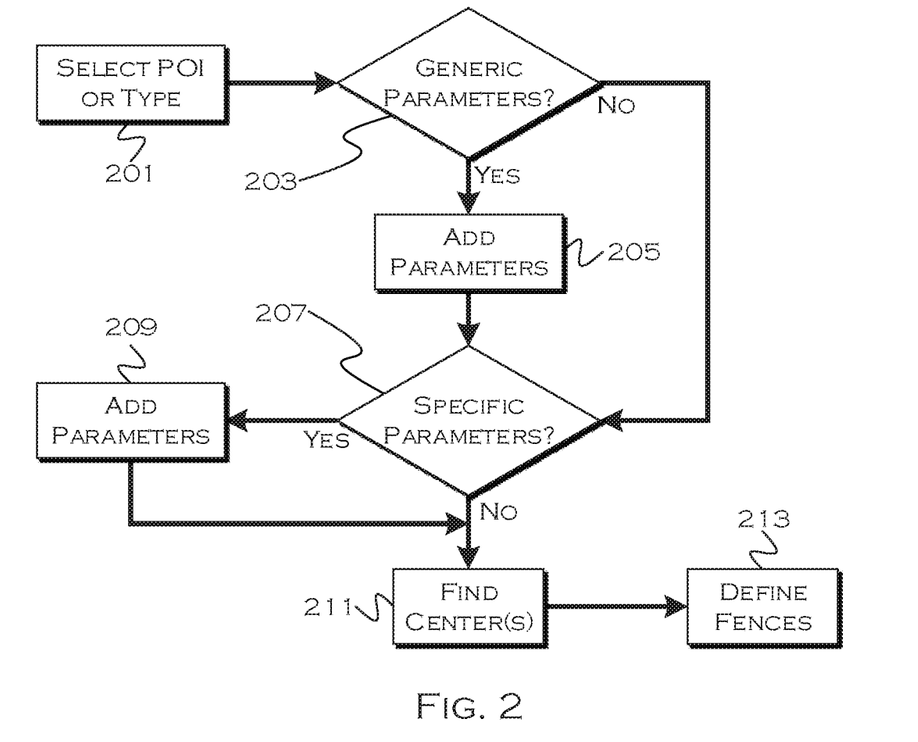
FIG. 2 shows an illustrative process for defining an adaptive geo-fence.

FIG. 2 shows an illustrative process for defining an adaptive geo-fence. In this example, the process will assign a set of parameters to a specific point of interest (POI) or a type of POI (e.g., grocery store) or other category. The process begins by receiving 201 identification/selection of a POIT or POI type for such an assignment. The process may consider all POIs in a given area, or POIs along a current route or within a predefined range of a current route. Portions of this process can also serve to more generally configure fences for a POI or set of POIs.

The parameters, in this case, define, for example, when a geofence is defined for the POI, dimensions of the geofence, how the fence should adapt (rates of change and trigger conditions) and when the fence should cease. So, to use the lunch example, but from the perspective of a business (the fence is around the business, instead of the vehicle), the process could receive "restaurant" as the POI type. The process could then go on to assign a set of driver preferences (10 minutes from route) and could adapt fences to reflect locations that are less than 10 minutes from a given restaurant POI. These fences could change based on increased/decreased traffic, so that at any given time the fences reflect all points from which the restaurant can be reached within 10 minutes. To the extent that any of those fences overlap the current route, those are candidate restaurants, but increased traffic in the proximity of a restaurant may cause the fence to diminish in size such that it no longer overlaps a route.

Further, the user could assign a "wait" parameter, and if wait-times were available for the restaurants, fences could be turned on and off dynamically based on current wait time correlation to the instructed wait times.

The process may begin by assigning 205 any "generic" parameters that exist 203. In this example, generic parameters are predefined for a given POI or POI type, based on user preconfiguration or a configuration file provided by a manufacturer, for example. The user can also specify current specific 207 parameters, which can include variances to generic parameters by POI or type, and/or new parameters for the current journey. For example, if the default preferences were 10 minutes travel and 5 minutes wait for restaurants during the work week, but the user was pressed for time, the user might specify 5 minutes travel and 3 minutes wait, or any other combination resulting in a total of 8 minutes or less before food is projected to be received. Similarly, travel time back could be accommodated by the fence, because a 5 minute detour that results in a 30 minute return trip due to one-directional traffic may be undesirable to many users. The process adds 209 any specific parameters.

Once the parameters have been defined, the process then finds 211 any relevant centers for any fences that should exist and defines 213 fences around those centers (e.g., POI locations). The fences can then adapt in accordance with the parameters.

Figure 3:
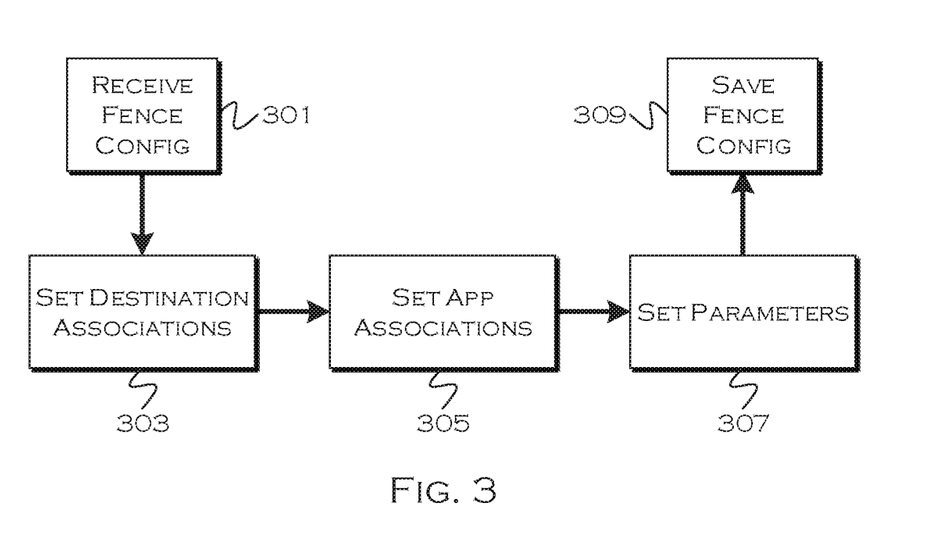
FIG. 3 shows an illustrative process for fence configuration.

FIG. 3 shows an illustrative process for fence configuration. In this example, the process receives 301 a request or instruction to configure a fence for a journey. The process receives 303 instructions defining actions to be taken based on any association between the fence and a destination. For example, if the destination was a store where the user had ordered ahead, the fence could be configured to be "an area representing 10 minutes of travel" from a current vehicle location, and when the store (destination) fell within the area of travel, the vehicle could notify the store that the user was 10 minutes away. This would be an example of a reactive parameter.

The process also receives 305 any applications to be associated with the fence. To continue with the store+preorder example, the facilitation of communication between the store and vehicle may be done through a $3^{rd}$ party application, which relies on the geofence informing the vehicle (and thus the application through communication from the vehicle) or the application directly about the store+fence relationship. Finally, the process receives/sets 305 parameters associated with the fence, which can include, for example, the parameters previously discussed and fence adaptive parameters defining how a fence varies (such as the 10 minute of travel parameter). The process then saves 309 the fence configuration for use by the vehicle/mobile device during travel.

The fence can have adaptive parameters associated therewith that define when and how the fence can change in shape to adapt to changes in the parameters, which can be measured by a vehicle, mobile device or provided from an outside source while driving. The fence may further have a set of reactive parameters associated therewith, which define an action to be taken when the fence and another object of interest (e.g., vehicle or location, depending on which the fence surrounds) encounters the fence. The fence may also be associated with an application, if the application provides support or communication in furtherance of the parameters, for example.

Figure 4:
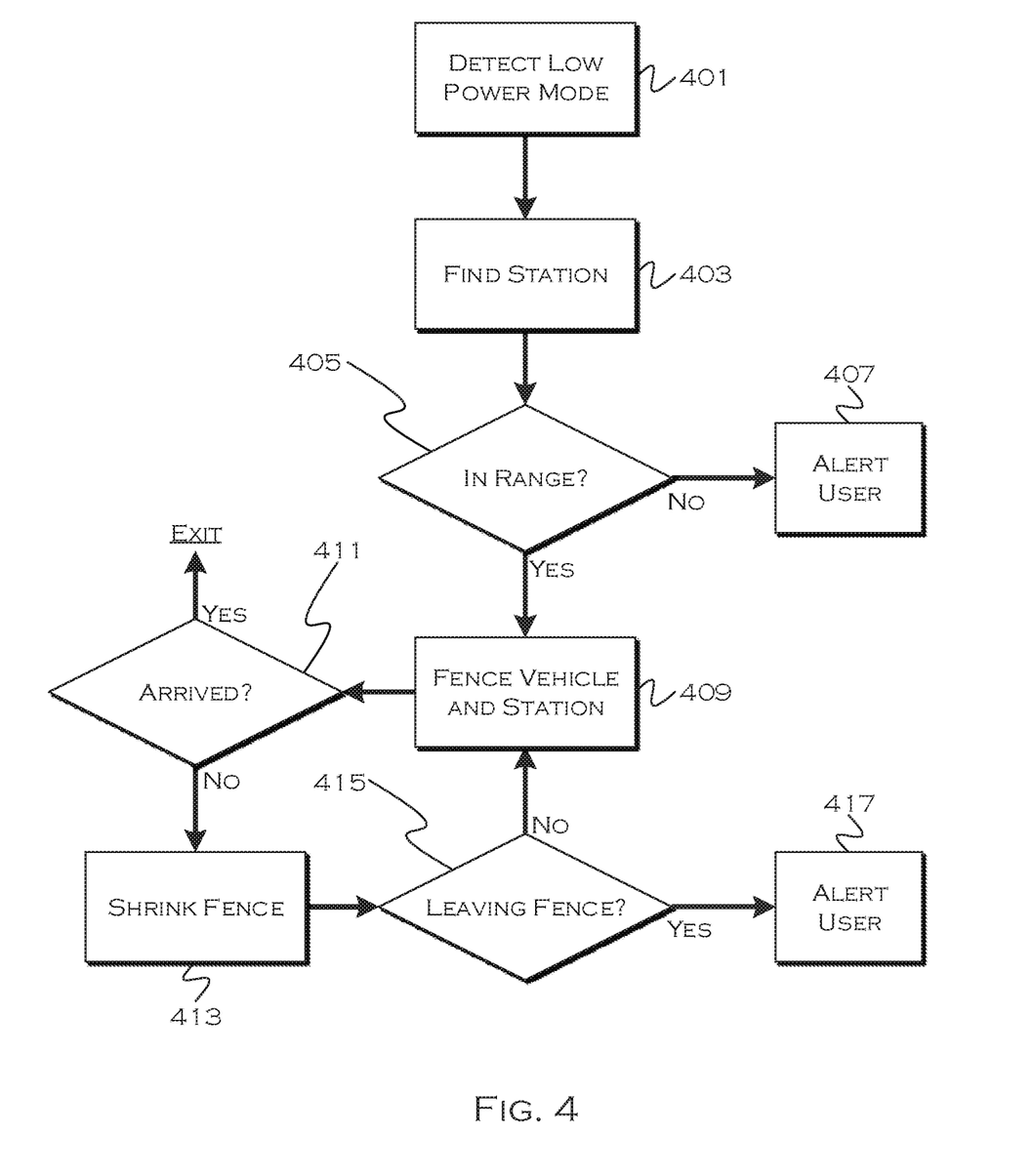
FIG. 4 shows an illustrative process for providing a fuel-related adaptable geo-fence.

FIG. 4 shows an illustrative process for providing a fuel-related (or charge-related) adaptable geo-fence. In this illustrative, non-limiting example, the process detects 403 that a vehicle is in a low-power state indicating that vehicle charge is low and that power preservation may have been engaged. The detection could occur prior to engaging a low power running state as well.

In response to power dropping below a certain level (such as a threshold level or, for example a level indicative of an inability to reach a destination), the process finds 403 one or more localized charging points. The process can search within a predefined radius based on projected remaining travel, and/or may search beyond that distance if nothing is found, or nothing is found in a desirable heading or locale (i.e., the user may not want to backtrack or go into a dangerous neighborhood).

If the station is not within range 405, the process may alert 407 the user of the out-of-range station. This could allow the user to further conserve power or plan ahead to be stranded (e.g., call roadside assistance and let them know that the user will be stranded at the edge of the range, near to an identified power charging point). If the vehicle is within range of the station, the process can fence 409 both the vehicle and station in a geofence. The boundaries of the geofence can be defined by vehicle range, and the fence can adaptively (and visually on a vehicle display, if desired) shrink responsive to diminishing power supply. If the station is about to drop out of the fence (and thus out of range) the user can be advised to change headings (more towards the station to keep it in range) or reduce power consumption (if heading to the station already). The "reaction" of the fence to the trigger of the station approaching the edge of the fence due to the fence moving or shrinking can be based on the "why" of why the fence is moving or shrinking. Thus, the fence is adaptive to the vehicle movement and power state, and the recommendation/alert is also adaptive to the reasons for why the fence is changing.

If the user has not yet arrived 411 at the station, the process will continue to shrink 413 the fence boundaries as the vehicle uses power (the fence being indicative of range). If the station is in danger of "leaving" the fence 415, the process can alert 417 the user as above, for example.

Figure 5:
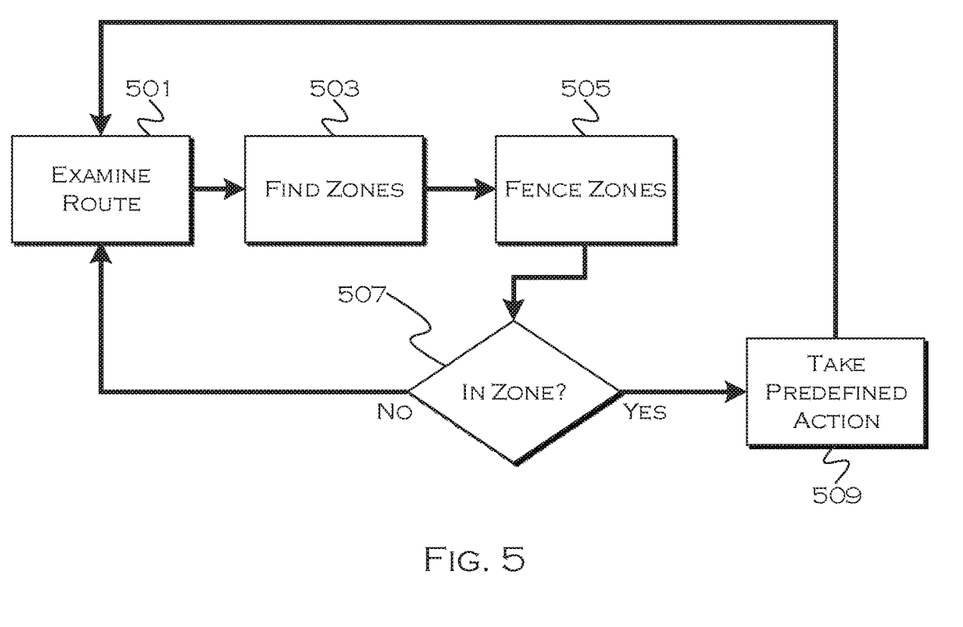
FIG. 5 shows an illustrative process for route planning including adaptable geo-fences.

FIG. 5 shows an illustrative process for route planning including adaptable geo-fences. In this example, the process has a variety of possible preconfigured geo-fences associated with locations along a route. Each fence may not occur along or in proximity to a given route. In this example, the process examines 501 the route and finds 503 correlating zones. The examination range can vary based on parameters associated with each POI or POI type. For example, if a "food" parameter is met (meaning food POIs are of interest), the process can find all POIs within a specified maximum food travel time/distance. On the other hand, the user may also need some over the counter medicine for a child, and may be willing to travel up to 20 minutes (which may be further than the food) to achieve this result. Thus, the parameters for finding pharmacy POIs may be larger in size than those for food. In this manner, the process can find and fence 505 zones of interest along the route.

In another example, the process could, based on time, day, weather, etc, create a plurality of fences around the vehicle of varying size, each designed to trigger a reaction upon encountering a POI of a particular type correlated to the fence. Or a blend of the two concepts could be used. When the vehicle and a POI are both within a corresponding fence (corresponding to the POI) 507, the process can take a predefined 509 action associated with the fence.

Figure 6:
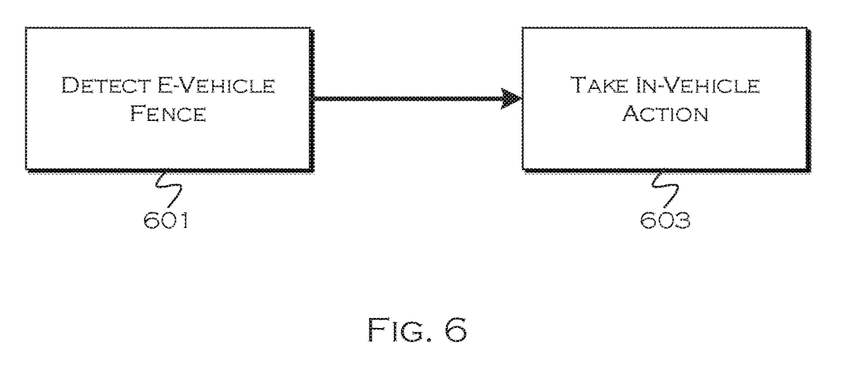
FIG. 6 shows an illustrative process for emergency vehicle fence handling.

FIG. 6 shows an illustrative process for emergency vehicle fence handling. In this example, the process fences an emergency vehicle with a fence detectable by all fence detection systems or fence detection systems of a corresponding type.

The adaptable fence around the vehicle can increase in size with vehicle speed, and can be directional in nature. Encountering the fence can cause a driver alert to pull over, along with any information about the emergency vehicle if needed. Thus, as a vehicle accelerates, for example, more and more drivers can be alerted. This can be particularly useful if it is not possible to determine the location of a siren or vehicle before the driver sees the vehicle (which may be too late).

If the vehicle process detects 601 the fence, the vehicle can take 603 an in-vehicle action, which could include a driver alert or even automatically pulling the vehicle off the road, if appropriate and safe.

Figure 7:
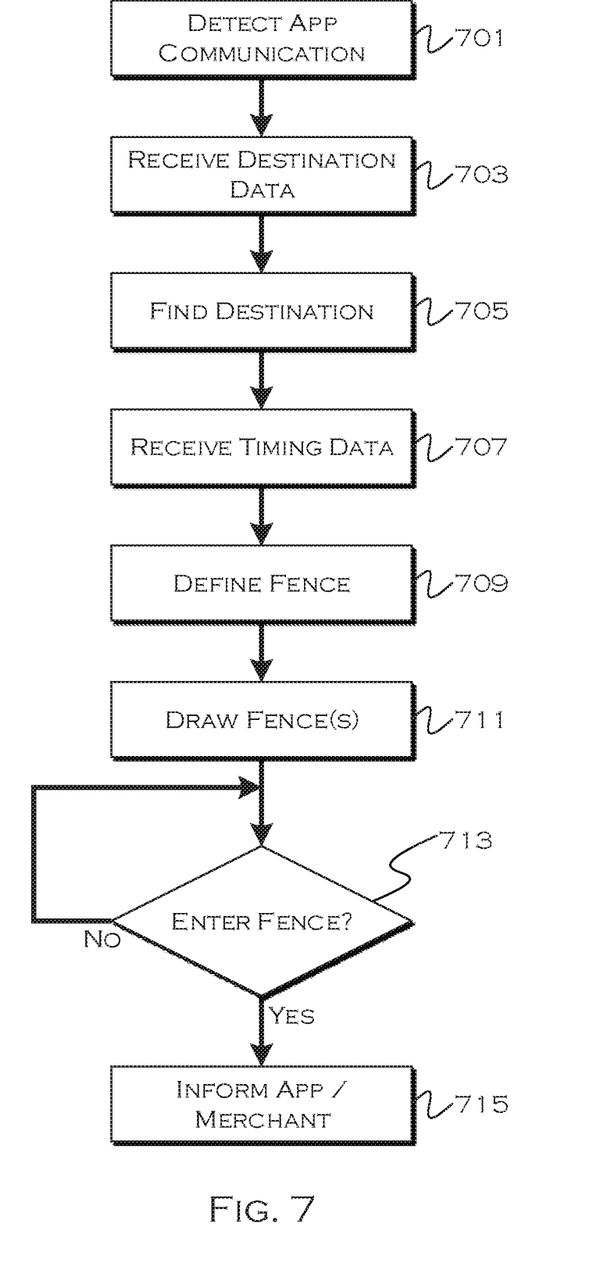
FIG. 7 shows an illustrative process for application and adaptable fence interaction.

FIG. 7 shows an illustrative process for application and adaptable fence interaction. In this example, the process detects 701 communication from an application which has an action and/or other geo-fence parameters. For example, if a person ordered groceries for pickup, the application could request a fence around a particular store, and an action of informing the store when the user was 10 minutes away. The parameter, in this case, would be the 10 minutes, although the parameter could also be tied to a current store workload (e.g., if it normally takes 10 minutes to prepare the order for pickup, but the store is busy, the parameter could expand to the current handling time).

The process receives 703 the destination data, which in this case could be the store location. The process then finds 705 the requested store and adjusts 707 to current timing data (handling time, in this case) if needed. The process defines 709 a fence around the destination or vehicle, the fence adapting to reflect travel of the timing parameter. For example, if the store was busy in this example, the fence may be set to 15 minutes of travel data out from the store or from a vehicle current location. This fence size and shape can vary with traffic, weather, light states, handling time, etc, so that the fence can potentially accurately reflect both real travel time and the necessary handling time. Once the process draws 711 or defines the fence, the process determines if the other of the two objects (the fence or store) that is unfenced has entered 713 the fence perimeter. This is an indication that the two objects are now the preferred time apart, and thus the process reacts by informing 715 the merchant (the requested action) that the driver is within the time or distance parameter.

A variety of functionality can be related to geo-fences surrounding particular areas. These fences can be dynamically defined and recognized as a driver travels, based on predefined driver conditions. For example, without limitation, changes can be made to driving modes if a driver enters an area designated for certain driving types (as indicated by a geo-fence around the area). Race tracks, for example, can have an automatic driving mode change associated therewith, as well as changes to a cluster display and power usage. Entering such an area could even enable certain track-related applications. While this is just an example, similar driving mode changes, vehicle display changes and application launches could be associated with a variety of changed-driving states responsive to geo-fences.

In another example, vehicle lighting or music could change based on a driver entering a fence around a favorite area or club. If a driver was headed to a gym, or approached a fenced gym, for example, the vehicle could play workout music and change lighting styles to get a driver "pumped up" for a workout. Similarly, approaching a club could engage what a driver has designated as "cool" looking music and lighting.

In other examples, fences around schools, neighborhoods, hospitals, etc could cause a responsive change that limits vehicle speeds, sounds, etc. In areas where driver distraction should be especially low, because of a high risk of encountering an unexpected road object, the vehicle could limit the amount of in-vehicle distraction, for example, by limiting music volume and interface controls. For example, if a driver was driving through a park, which includes both deer and people with high frequency, the vehicle could limit the interface controls or even blank a display for many functions, in order to help keep the driver focused on the road.

Similar concepts can be used to notify a dealer that a driver will arrive soon. Fences around service locations, food locations, merchants, etc., can cause a vehicle to suggest a purchase or servicing. In the case of dealerships, for example, the service could be recommended if needed.

If the fence around the dealership is large enough (e.g., 10 minutes of driving), a driver electing for service could provide up to 10 minutes notice to the dealer, which could allow for bay-emptying or other preparation work to be done in advance. This concept can also be used to check a person in, perhaps with a second, closer fence, which can keep both the dealership and the driver working efficiently.

These are simply a few non-limiting examples of how adaptive, reactive geo-fences can be used to improve navigation and driving experience. Other similar concepts are within the scope of the present invention as well.

The illustrative embodiments allow for adaptive geo-fences that improve the function of static geo-fences, change with changing conditions and causing actions based on intersection of fenced areas with objects of interest.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined in logical manners to produce situationally suitable variations of embodiments described herein.

What is claimed is:

1. A system comprising:
   a memory; and
   a processor in communication with the memory and configured to:
   receive, via a vehicle-related interface, a type of object to be geo-fenced;
   receive adaptive parameters defining how a geo-fence is configured to adapt to data types included with the adaptive parameters;
   find a plurality of instances of the object;
   create geo-fences around the found objects;
   track data corresponding to the adaptive parameters while a vehicle travels; and
   modify the created geo-fences based on the tracked data as guided by the adaptive parameters.

2. The system of claim 1, wherein the type of object includes a specific location.

3. The system of claim 1, wherein the type of object includes a type of location.

4. The system of claim 3, wherein the processor is configured to find an instance of the type of object within a predefined proximity to a current route.

5. The system of claim 1, wherein the object includes the vehicle.

6. The system of claim 1, wherein the adaptive parameters include parameters defining when a fence should be created.

7. The system of claim 1, wherein the adaptive parameters include parameters defining when a fence should be removed.

8. The system of claim 1, wherein the adaptive parameters include parameters defining when a fence should change size.

9. The system of claim 1, wherein the processor is included in a mobile device in wireless communication with a vehicle.

10. The system of claim 1, wherein the processor is included in the vehicle.

11. The system of claim 1, wherein the processor is further configured to:
    receive reactive parameters defining an action to occur and a fence-related condition under which the action occurs; and
    responsive to detecting an occurrence of the fence-related condition, perform or instruct performance of the action.

12. A system comprising:
    a memory; and
    a processor in communication with the memory and configured to:
    define a geo-fence around a vehicle within a perimeter that is defined based on an adaptive parameter that defines perimeter changes based on changes in data predefined as being associated with the perimeter;
    save a correlation between the geo-fence and a driver-defined action to be taken based on a location crossing the perimeter;
    modify the adaptive perimeter responsive to observed changes in the data; and
    take the defined action responsive to the location crossing the perimeter.

13. The system of claim 12, wherein the adaptive parameter includes a fuel level.

14. The system of claim 12, wherein the adaptive parameter includes travel time from the perimeter to the first object.

15. The system of claim 12, wherein the processor is also configured to associate an enablement parameter with the geo-fence and enable the geo-fence responsive to the enablement parameter being met.

16. The system of claim 15, wherein the enablement parameter includes time-of-day or day-of-week.

17. The system of claim 12, wherein the processor is also configured to associate a disablement parameter with the geo-fence and disable the geo-fence responsive to the disablement parameter being met.

18. A system comprising:
   a memory; and
   a processor in communication with the memory and configured to:
   determine that parameters for fence enablement, associated with different points of interest (POIs), are met;
   create a plurality of geo-fences around a vehicle, that move with the vehicle, each of the fences corresponding to a POI and having an action associated therewith; and
   responsive to one of the fences encountering the corresponding POI, taking the action associated with the one of the fences.

19. The system of claim 18, wherein each of the fences is further defined by an adaptable perimeter that adapts to parameters associated with the POI corresponding to a given fence as the vehicle travels.

* * * * *